United States Patent
Cobb et al.

(10) Patent No.: US 12,495,062 B2
(45) Date of Patent: Dec. 9, 2025

(54) CONTINUOUS AUTHENTICATION IN SECURE AND ISOLATED NETWORK ENVIRONMENTS

(71) Applicant: SoftWarfare, LLC, Shawnee, KS (US)

(72) Inventors: Wyatt Cobb, Mission Hills, KS (US);
Zach Dougherty, Merriam, KS (US);
Micah Juhnke, Liberty, MO (US);
Brandon Shannon, Lawrence, KS (US)

(73) Assignee: SoftWarfare, LLC, Prairie Village, KS (US)

( * ) Notice: Subject to any disclaimer, the term of this patent is extended or adjusted under 35 U.S.C. 154(b) by 151 days.

(21) Appl. No.: 18/471,831

(22) Filed: Sep. 21, 2023

(65) Prior Publication Data

US 2025/0106236 A1    Mar. 27, 2025

(51) Int. Cl.
*H04L 29/00* (2006.01)
*H04L 9/40* (2022.01)

(52) U.S. Cl.
CPC ........ *H04L 63/1433* (2013.01); *H04L 63/083* (2013.01)

(58) Field of Classification Search
CPC .................. H04L 63/1433; H04L 63/083
See application file for complete search history.

(56) References Cited

U.S. PATENT DOCUMENTS

| | | | | |
|---|---|---|---|---|
| 9,521,606 B1* | 12/2016 | Costa | ................... | H04L 63/083 |
| 10,044,751 B2* | 8/2018 | Huston, III | ......... | H04L 63/1441 |
| 10,171,495 B1* | 1/2019 | Bowen | ................. | H04L 63/1425 |
| 2011/0314558 A1* | 12/2011 | Song | ..................... | G06F 21/316 |
| | | | | 726/28 |
| 2014/0143863 A1* | 5/2014 | Deb | .................... | H04L 63/1433 |
| | | | | 726/22 |
| 2016/0065598 A1* | 3/2016 | Modi | .................. | H04L 63/1408 |
| | | | | 726/23 |
| 2016/0065599 A1* | 3/2016 | Hovor | .................... | H04L 67/10 |
| | | | | 726/23 |
| 2016/0330219 A1* | 11/2016 | Hasan | ................. | H04L 63/1408 |
| 2017/0180339 A1* | 6/2017 | Cheng | ..................... | G06F 21/31 |
| 2021/0203674 A1* | 7/2021 | Azaria | ................ | H04L 63/1441 |
| 2021/0352088 A1* | 11/2021 | Adams | .................... | G06F 21/44 |
| 2021/0406402 A1* | 12/2021 | Seibel | ................ | G06Q 30/0201 |

(Continued)

FOREIGN PATENT DOCUMENTS

WO    WO-2019164807 A1 *    8/2019    ........... G08G 1/0112

*Primary Examiner* — Don G Zhao
(74) *Attorney, Agent, or Firm* — Erise IP, P.A.

(57) ABSTRACT

Embodiments of the current disclosure are directed to authorizing data transfers and permissions requests in secure networks. In some embodiments, requesting users may request data transfers and access to secure networks, data, resources, documents, and the like. Continuous monitoring, risk analysis, and authorization may be performed in real time in the secure networks by utilizing statistical and machine learning algorithms as well as rules engines to determine a likelihood of the requests being a threat and determine an overall risk level associated with the threat. Furthermore, the secure networks may comprise denied, disrupted, intermittent, and limited-bandwidth (DDIL) DDIL environments that are disconnected from network environments for extended periods. As such, various request authentication techniques may be implemented in the DDIL environments.

20 Claims, 4 Drawing Sheets

(56) References Cited

U.S. PATENT DOCUMENTS

| | | | |
|---|---|---|---|
| 2022/0086175 A1* | 3/2022 | Bharrat | G06N 3/088 |
| 2023/0135755 A1* | 5/2023 | Nakar | H04L 63/1441 |
| | | | 726/11 |
| 2024/0223607 A1* | 7/2024 | Weber | H04L 63/1433 |
| 2024/0396894 A1* | 11/2024 | Fisher | H04L 67/1097 |
| 2025/0008328 A1* | 1/2025 | Smith | H04L 63/065 |
| 2025/0039260 A1* | 1/2025 | Kharbanda | H04L 67/568 |
| 2025/0106236 A1* | 3/2025 | Cobb | H04L 63/083 |

* cited by examiner

CONTINUOUS AUTHENTICATION IN SECURE AND ISOLATED NETWORK ENVIRONMENTS

BACKGROUND

1. Field

Embodiments of the current disclosure are broadly related to detecting threats in networks. More specifically, embodiments of the current disclosure are directed to detecting threats in secure and isolated network environments.

2. Related Art

Typically, identification of threats is performed by accessing permissions from a permissions server that evaluates credentials of a user requesting permission to join a network and perform tasks associated with the network. The user may enter identifying information such as a username and a password. In some scenarios, additional data may be analyzed for higher levels of confidence in the requesting user's identity. Typically, the additional data comprises multi-factor authentication, user computer IP address, user computer digital signatures, and the like. However, problems arise in secure networks that are disconnected from the Internet and disconnected from the permission server.

There are currently limited methods of authenticating users requesting access to and/or in secure and isolated local networks. Particularly, there are limited methods of authenticating users requesting access to and/or in denied, disrupted, intermittent, and limited-bandwidth (DDIL) environments comprising mobile devices with restricted access and processing limitations, where the mobile devices may be disconnected for unknown time ranges.

SUMMARY

Embodiments of the invention address the above-described needs by providing systems and methods for detecting threats in secure and isolated DDIL environments, storing all data and actions taken within the secure and isolated environments, and uploading the stored actions to a network environment for verification and validation of the actions taken when connected to the network environment.

A first embodiment of the current disclosure is directed to one or more non-transitory computer-readable media that store computer-executable instructions that, when executed by at least one processor, perform a method of authenticating a request on a secure network. The method includes receiving the request to transfer data on the secure network from a requesting device by a requesting user, obtaining requesting user ID data, behavioral data, and machine data from the requesting device; comparing the requesting user ID data, the behavioral data, and the machine data from the requesting device to historical data to determine a likelihood that the request is threat, comparing, by a rules engine, the likelihood that the request is the threat to a threshold value to determine a risk level associated with the request, and authenticating the request based on the risk level.

In some aspects, the techniques described herein relate to the media, wherein the method further includes comparing the requesting user ID data, the behavioral data, and the machine data to the historical data by a machine learning algorithm to determine the likelihood of the threat of the request.

In some aspects, the techniques described herein relate to the media, wherein the request includes a request to communicatively connect to a denied, disrupted, intermittent, and limited-bandwidth (DDIL) environment; and wherein the method further includes generating an offline authorization token for the requesting user associated with the request to access the DDIL environment.

In some aspects, the techniques described herein relate to the media, wherein the secure network is a denied, disrupted, intermittent, and limited-bandwidth (DDIL) environment, and wherein the DDIL environment includes locally stored infrastructure from a cloud-based provider.

In some aspects, the techniques described herein relate to the media, wherein the method further includes storing the requesting user ID data, the behavioral data, the machine data, the likelihood, and the authenticating to a blockchain in the DDIL environment, and wherein, when connected to a network environment, the DDIL environment is configured to: provide access to the blockchain to the network environment for verifying the authenticating of the request, update infrastructure and applications from the cloud-based provider, and audit data logs stored on the blockchain.

In some aspects, the techniques described herein relate to the media, wherein the method further includes performing a peer-to-peer authentication of the request. The peer-to-peer authentication includes randomly selecting a subset of approved users in the DDIL environment from a set of approved users authorized to access the DDIL environment, providing at least a subset of the user ID data to the subset of approved users, receiving feedback from the subset of approved users, and modifying the likelihood of the request being the threat based on the feedback from the subset of approved users.

In some aspects, the techniques described herein relate to the media, wherein the method further includes a peer-to-peer authentication of the request. The peer-to-peer authentication includes randomly selecting a subset of users from a set of users authorized to access the DDIL environment, providing at least the user ID data to the subset of users, receiving at least one denial of the request to communicatively connect to the DDIL environment, denying the request to access the DDIL environment; and storing data indicative of the user ID data, the at least one denial, and the denying in a blockchain configured to be uploaded to a network environment when the DDIL environment is connected to the network environment.

In some aspects, the techniques described herein relate to the media, wherein the DDIL environment includes a local network of integrated mobile devices associated with military personnel.

In some aspects, the techniques described herein relate to the media, wherein the request is a request to access the DDIL environment, and wherein the method further includes denying a user associated with the request access to resources in the DDIL environment.

In some aspects, the techniques described herein relate to a system for authentication a request on a secure network, the system including at least one data store, at least one processor, and one or more non-transitory computer-readable media that store computer-executable instructions that, when executed by the at least one processor, perform a method of authenticating the request on the secure network. The method includes receiving the request to transfer data on the secure network from a requesting device, obtaining requesting user ID data, behavioral data, and machine data from the requesting device, comparing the requesting user ID data, the behavioral data, and the machine data from the requesting device to historical data to determine a likelihood that the request is threat, comparing, by a rules engine, the likelihood that the request is the threat to a threshold value to determine a risk level associated with the request; and authenticating the request based on the risk level.

In some aspects, the techniques described herein relate to the system, wherein the method further includes comparing the requesting user ID data, the behavioral data, and the machine data to the historical data by a machine learning algorithm to determine the likelihood of the threat of the request.

In some aspects, the techniques described herein relate to the system, wherein the request includes a request to communicatively connect to a DDIL environment, and wherein the method further includes generating an offline authorization token for a requesting user associated with the request to access the DDIL environment.

In some aspects, the techniques described herein relate to the system, wherein the comparing by the rules engine results in an approved designation from an options list of approve, deny, and more information needed.

In some aspects, the techniques described herein relate to the system, wherein the method further includes continually analyzing and storing data associated with the requesting device and the requesting user associated with the requesting device, and authenticating actions associated with the requesting user and the requesting device after the request is authorized.

In some aspects, the techniques described herein relate to a method of authenticating a request on a secure network. The method includes receiving the request to transfer data on the secure network from a requesting device, wherein the secure network is a denied, disrupted, intermittent, and limited-bandwidth (DDIL) environment, obtaining requesting user ID data, behavioral data, and machine data from the requesting device, comparing the requesting user ID data, the behavioral data, and the machine data from the requesting device with historical data to determine a likelihood that the request is threat; comparing, by a rules engine, the likelihood that the request is the threat to a threshold value to determine a risk level associated with the request, and authenticating the request based on the risk level.

In some aspects, the techniques described herein relate to the method, further including storing the requesting user ID data, the behavioral data, the machine data, the likelihood, and the authenticating to a blockchain in the DDIL environment, and wherein, when connected to a network environment, the DDIL environment is configured to provide access to the blockchain to the network environment for verifying the authenticating of the request; and audit data logs stored on the blockchain.

In some aspects, the techniques described herein relate to the method, further including randomly selecting a subset of approved users in the DDIL environment from a set of approved users authorized to access the DDIL environment, providing at least a subset of the user ID data to the subset of approved users; receiving feedback from the subset of approved users, and modifying the likelihood of the request being the threat based on the feedback from the subset of approved users.

In some aspects, the techniques described herein relate to the method, further including randomly selecting a subset of users from a set of users authorized to access the DDIL environment, providing at least the user ID data to the subset of users, receiving at least one denial of the request to communicatively connect to the DDIL environment, denying the request to access the DDIL environment, and storing data indicative of the user ID data, the at least one denial, and the denying in a blockchain configured to be uploaded to a network environment when the DDIL environment is connected to the network environment.

In some aspects, the techniques described herein relate to the method, wherein the DDIL environment includes a local network of integrated mobile devices associated with military personnel.

In some aspects, the techniques described herein relate to the method, wherein the request includes a request to access the DDIL environment, and wherein the method further includes denying a requesting user associated with the request access to resources in the DDIL environment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the disclosure are directed authenticating users is a DDIL environment comprising a local, secure, and isolated computer network. A user may request access infrastructure, applications, higher security levels, to the DDIL environment, and the like. The isolated computer network, generally referenced as the DDIL environment herein, may then initiate an authentication process for authenticating the requesting user. As the DDIL environment is not connected externally to a network for verification of the user's credentials, an internal audit of the user must be completed to authorize the requesting user. Various methods of authenticating the user may take place including analyzing the requesting user data to determine if the user is authorized, performing a peer-to-peer analysis, performing adaptive analysis, and the like. The authorization workflow may build a confidence, or likelihood that the proposed identity of the requesting user is accurate. If the requesting user's identity is confirmed with a level of confidence, or above a likelihood threshold, the user identity may be temporarily verified and authorization to access the DDIL environment and/or the associated permissions may be provided to the requesting use. However, if the likelihood falls below the threshold value, or is denied by approved users, the requesting user may be blocked, and a threat mitigation process may be initiated.

Furthermore, in some embodiments, the requesting user data and data associated with the actions taken during the authentication processes may be stored forward in a blockchain algorithm. Upon connection to the exterior network environment, the blockchain may be evaluated by the network environment, again providing a computer network comprising a permissions server, to determine if the actions taken were correct and if the data associated with each event and each user is consistent. When the actions are confirmed to have been correct network environment may update each future connection with various DDIL environments. If the actions taken were incorrect and a potential threat is determined, network environment may isolate the DDIL environment and initiate a threat mitigation task including at least warning other DDIL environments to look for the potential threat and alerting network professionals.

Figure 1:
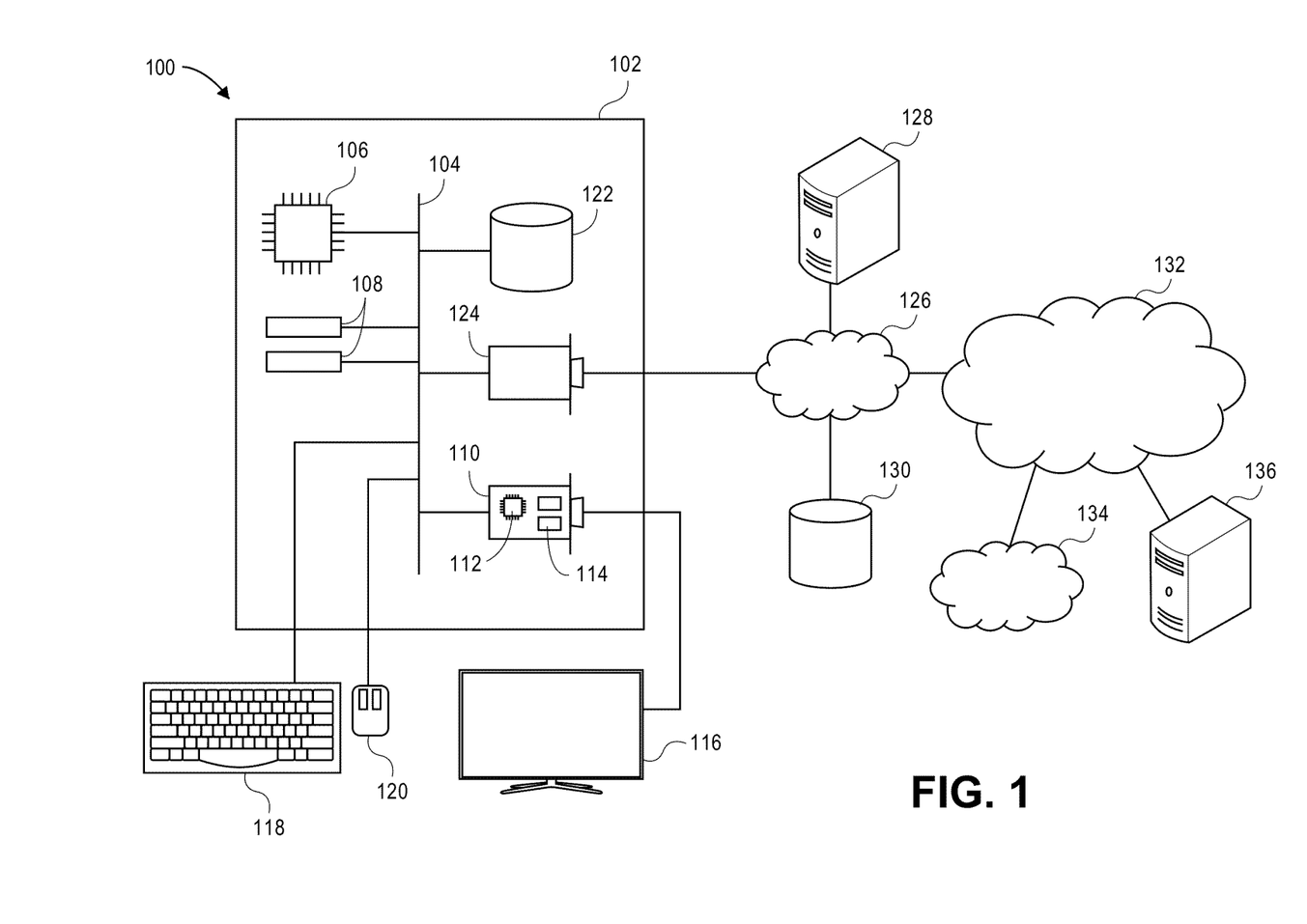
FIG. 1 depicts an exemplary hardware platform for certain embodiments of network environments and DDIL environments.

Turning first to FIG. 1, an exemplary hardware platform of computing system 100 for certain embodiments of the invention is depicted. Computer 102 can be a desktop computer, a laptop computer, a server computer, a recording device manager, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Additionally, any number of sensors (not shown) such as the biometric sensor discussed above may also be connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In certain embodiments, computer 102 can itself be directly connected to Internet 132. In some embodiments, the system depicted in FIG. 1 may be connected to a web-based application platform and run applications through the web-based platform or may provide the web-based platform to other computers to run applications, manage workflows, and store and manage data.

Figure 2:
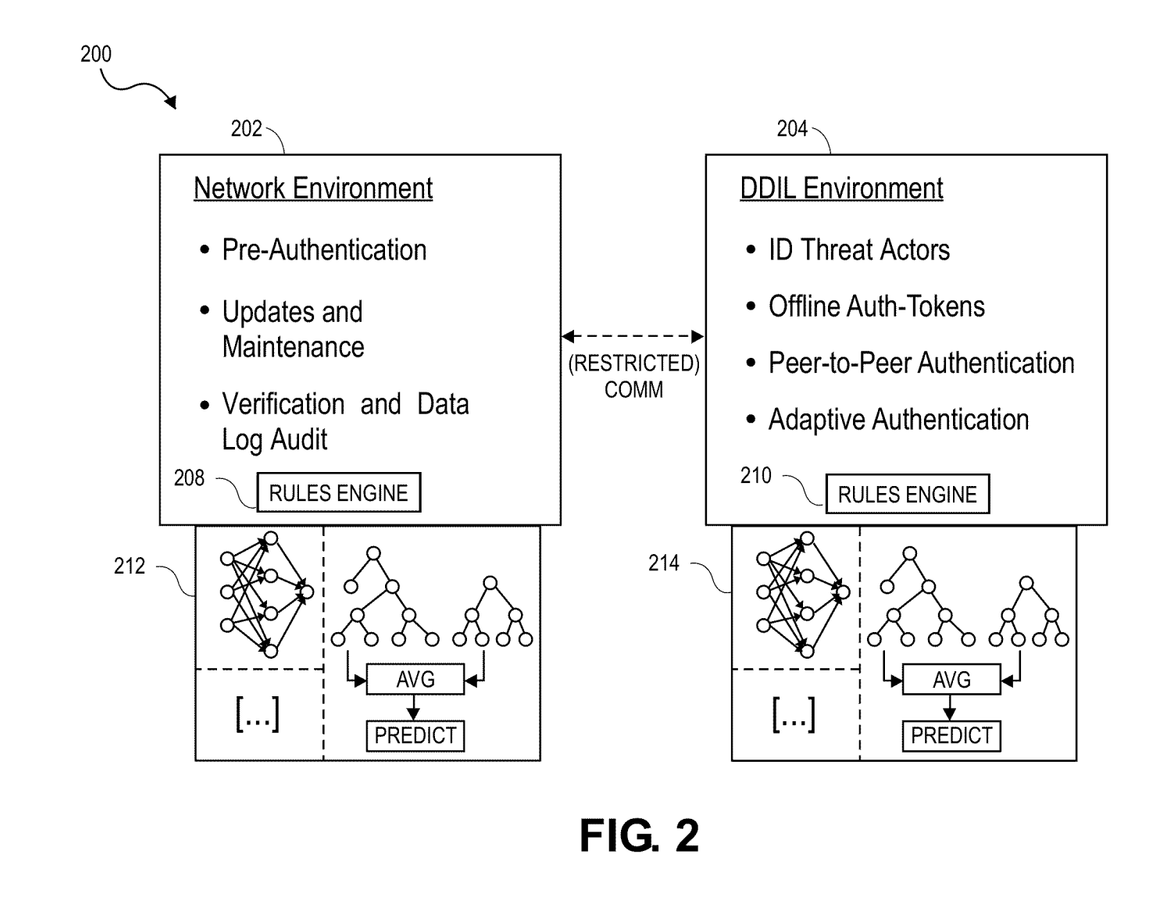
FIG. 2 depicts a network environment and DDIL environment.

Turning now to an embodiment depicted in FIG. 2, presenting network system 200 comprising network environment 202 in restricted communication with denied, disrupted, intermittent, and limited-bandwidth (DDIL) environment 204. In some embodiments, each of network environment 202 and DDIL environment 204 may comprise computer system 100. Furthermore, network environment 202 and DDIL environment 204 may comprise one or more processors and data stores dedicated to user authentication analysis and data storage as described herein. For example, network environment 202 may comprise network rules engine 208 and network models 212 (FIG. 2), and DDIL environment 204 may comprise DDIL rules engine 210 and DDIL models 214 (FIG. 2). Each rules engine and analysis engine may have a dedicated processor and data store for separately and securely performing the authentication and analysis described herein. In some embodiments, the data stored in the data stored may be stored in a blockchain 412 (FIG. 4) by a blockchain algorithm.

Network system 200 may provide web-based workflow management and security while supporting application-to-application, business-to-business, or any other connection and communication that may be useful. Network system 200 may provide platform services such as integration Platform as a Service (iPaaS) and Software as a Service (Saas). At a high-level, the system provides capabilities to enable subscribers to implement data, application, application program interfaces (API) and process integration projects spanning cloud-resident and on-premises endpoints. This is achieved by developing, deploying, executing, managing and monitoring integration flows (integration interfaces), or integration applications bridging between multiple endpoints and enabling them to work together. In some embodiments of the system, on-premises hardware and software such as Enterprise Resource Planning (ERP) and Customer Relationship Management (CRM) software (ERP/CRM), local data store, and homegrown applications may be connected to network environment 202 that may support web-based functions such as computing and management, data store and management and open data sources. Additionally, network system 200 may support many more services and features that may be available.

In some embodiments of the system a high level of security is integrated. The security may be customized by the user, an administrator, or any person with a level of clearance above a minimum threshold. The security may also be determined by and meet the standard of compliance regulations such as those provided by PCI-DSS, NERC CIP, SCADA, HIPA-HYTRUST, GDPR, FERC, or any other set of standards.

In some embodiments, common communication protocols may be used between different endpoints. Network system 200 may provide a single platform integrating these endpoints and provide the data mapping from one endpoint to the next. Typical communication protocol connectors that may be used in embodiments of the invention are FTP, HTTP, AMQP, MQTT, Kafka, AS1/2/3/4, or any other communication protocol connectors that may be used and integrated into the system.

In some embodiments, network system 200 may be capable of mapping a diverse group of data formats and standards. For example, typical data formats that may be used are XML, JSON, ASN.1. However, any other format may be used. Without departing from the scope of the invention typical data standards are EDIFACT, HL7, SWIFT. However, any other standard for describing and formatting data may be used.

Embodiments of network system 200 may map data from endpoint-to-endpoint such as from a source to a destination or peer-to-peer. Network system 200 may provide data quality, routing and orchestration, integration flow for development and life cycle management tools, integration flow for operational monitoring and management, full life cycle API management, and security for all data.

Figure 4:
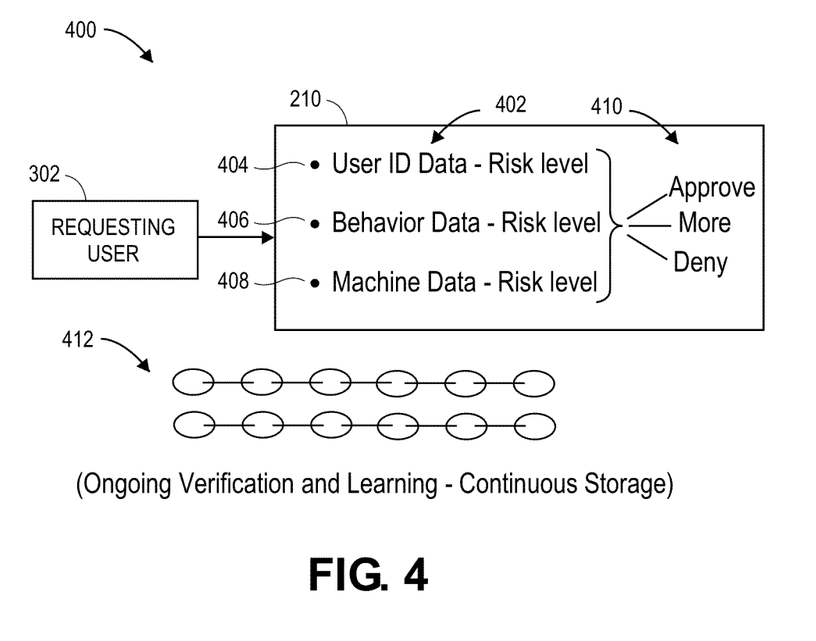
FIG. 4 depicts an exemplary adaptive user evaluation and blockchain storage thereof.

In some embodiments, a user of network system 200 may set up a profile, as described herein as user ID data 404 (FIG. 4). User ID data 404 may include the user's name, date of birth, address, rank or position within a company or military group, company/military identification number, as well as any biometric data such as fingerprint information, facial recognition information, iris scan information, DNA information, and/or any other type of biometric data that may be useful in identifying the user. In some embodiments, user data 402 may include the user ID data 404, machine data 408, and user interaction data, referenced herein as behavioral data 406 (FIG. 4).

In some embodiments, DDIL environment 204 comprises the hardware platform of FIG. 1 but with no/restricted network communication as shown in FIG. 2. As described above, DDIL environment 204 stands for denied, degraded, intermittent, and limited bandwidth. In exemplary scenarios of DDIL environment 204 herein, a user may be a military person in the field, and the communications may involve sensitive information. The user may have a mobile communication device for communicating with other personnel in the field as well as a command base, which may also comprise a computing device restricted to DDIL environment 204. Typically, these mobile devices are rugged and lightweight and have limited processing power. It may be necessary to optimize processing to ensure real-time communication. As such, as described above, the user authentication processes described herein may have dedicated hardware.

Accessing DDIL environment 204 may provide a strategic advantage for an adversary. As such, an adversary may attempt to access DDIL environment 204 to retrieve information, data, and/or disrupt communications. As such, network system 200 may include the DDIL environment 204 where communication may be intentionally denied, degraded by the physical environment, intentionally intermittent to limit communication and/or by the environment, and limited bandwidth. As such, there may only be a local group of users with access to DDIL environment 204. The local group of users may include the field personnel with authorization, and/or a user such as a commander or a command center that may include a plurality of users with access and at least one dedicated device operable in DDIL environment 204.

In some embodiments, cloud-based infrastructure such as PaaS may deployed in DDIL environment 204 for supporting the work of the users in the field on mobile devices while disconnected from network environment 202. Continual updates and authorization of users in DDIL environment 204 may not be possible when DDIL environment 204 is disconnected from network environment 202. As such, systems and methods for enabling authorization of users to access PaaS systems and supported applications in network environment 202 and DDIL environment 204 are described herein. The applications deployed in DDIL environment 204 provide the users the ability to perform their jobs while securely communicating the necessary intelligence to pass critical information quickly and efficiently to the necessary personnel within DDIL environment 204. As such, all levels of user authentication may be supported in DDIL environment 204.

Furthermore, DDIL environment 204 may communicate periodically with network environment 202 for updates, platform and application management and updates, user and authorization tracking and verification of decisions within DDIL environment 204 while disconnected. As such, network environment 202 may communicate with DDIL environment 204 using any of the above-described communication protocols.

In some embodiments, authentication in network environment 202 may be performed by network models 212 and network rules engine 208 and authentication in DDIL environment 204 may be performed by DDIL models 214 and DDIL rules engine 210 performing analysis on user data 402 and applying rules to build confidence in an identity of a user and/or determining if the user should be authorized. As used herein, identity of the user may include data indicative of the user's identity, data indicative of a user computing device, and/or a compilation of data points pointing to or away from access approval regardless of the user's actual identity. Thus, the user's identity may be the identity of the user or may simply be a collection of data points indicative of access or denial to network environment 202 and/or DDIL environment 204. For example, in some embodiments, the user's identity may not be known and only a digital code may be stored locally in DDIL environment 204. The digital code may be associated with various data comprising a subset of user identification (ID) data 404, behavioral data 406, and machine data 408; however, data indicative of the identity of the user may be stored externally (e.g., at network environment 202). As such, authentication may be performed for the digital code without actually verifying the user's identity. The user's identity may only be verified when DDIL environment 204 is connected to network environment 202 and the user's identity is associated with the digital code.

Network rules engine 208 and DDIL rules engine 210 may provide rules for building confidence in the identity of users (e.g., requesting user 302 (FIG. 3)). As described above, the rules engines may comprise dedicated hardware for processing rules based on user data 402, and user data 402 may comprise an identity matrix including user ID data 404, behavioral data 406, and machine data 408 as described above. In some embodiments, network models 212 and DDIL models 214 may determine a likelihood of accuracy of the identity of requesting user 302 using user data 402 associated with requesting user 302. The rules engines may comprise various operations, or functions, that receive user data 402 as an input matrix and perform various operations to determine a likelihood of the identity of requesting user 302 and/or output a determination of approved or denied access, or more information is needed to make a determination.

Figure 3:
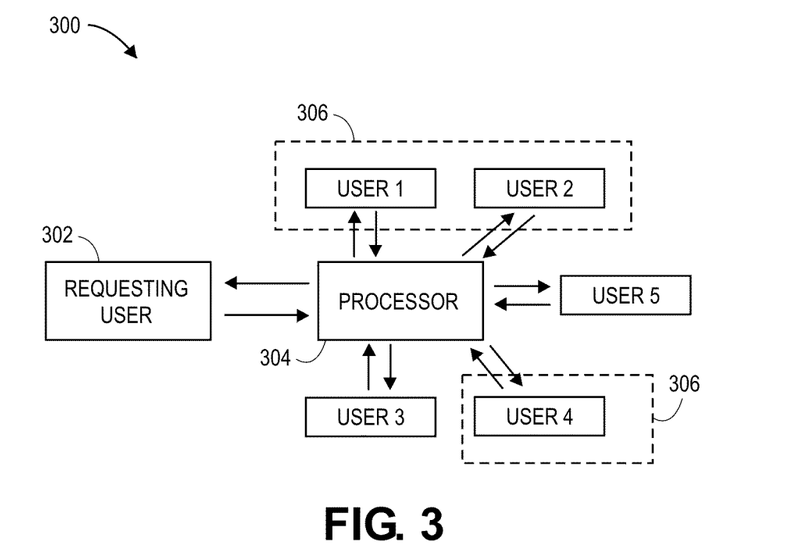
FIG. 3 depicts an exemplary peer-to-peer authentication network.

Requesting user 302, is described in examples herein as a user attempting to access network environment 202 and/or DDIL environment 204; however, requesting user 302 may be any detected anomaly in either environment including but not limited to requesting user 302 requesting access to network environment 202 and/or DDIL environment 204, requesting access to applications, and/or a higher level of data access than currently permitted, requesting a higher rank, and the like. Furthermore, in some embodiments, the anomaly, represented by requesting user 302, may be a new communication connection request from a new device or a known and approved device and/or detection of a new application or an attempt to upload data from new or pre-existing user and/or a new or pre-existing and approved device. It should be recognized that any request from a device, wireless or wired communication connection, or any user associated therewith may be represented by requesting user 302 attempting to make a connection with or request additional permissions in network environment 202 and/or DDIL environment 204.

In some embodiments, requesting user 302 may request access to network environment 202 and/or DDIL environment 204 when DDIL environment 204 and network environment 202 are either connected or disconnected. In this scenario either or both network environment 202 and DDIL environment 204 may analyze user data 402 of requesting user 302 to determine a likelihood of the identity of requesting user 302. However, if network environment 202 and DDIL environment are connected, network environment may perform the authorization techniques described herein and simply pass user data 402 and permissions information on to DDIL environment 204.

Requesting user 302 may request access to network environment 202 and/or DDIL environment 204 and/or an application, data, documents, and the like. Requesting user 302 may be a non-authorized user, non-authorized device, suspicious communication connection, or an authorized user/device/connection that has not accessed the network environment 202 or DDIL environment 204 in a minimum threshold time. As such, requesting user 302 may go through the new, or re-, authentication process as a return user may have different credentials and/or authentication attributes may have changed since the return user last accessed network environment 202 and/or DDIL environment 204. In an exemplary attempt to access data in network environment 202, network models 212 and network rules engine 208 may access requesting user data 402 including user ID data 404, behavioral data 406, and machine data 408 and compare user data 402 to stored data in network environment 202. User data 402 may match stored data indicative of an authorized member. As such, It may be determined that requesting user 302 is pre-authorized and permission to access network environment 202 and all approved applications may be provided, as well as permissions to access DDIL environment 204 if the user possesses the proper credentials.

In some embodiments, network models 212 and DDIL models 214 as well as the rules used by DDIL rules engine 210 and network rules engine 208 may be set by engineers, administrators, users, or the like. In some embodiments, the rules may be determined, modified, and/or weighted based on the results of statistical analysis and machine learning models (e.g., network models 212 and DDIL models 214). Furthermore, network models 212 and DDIL models 214 may analyze all data processed through network environment 202 and DDIL environment 204 for any sign of anomalies.

Exemplary statistical and machine learning algorithms (e.g., network models 212 and DDIL models 214) may optimize outcome objectives and classify rules and/or user data 402 that realize the goals based on objectives. In some embodiments, preconditioning of user data may serve to standardize the data for analysis for statistical and machine learning models, decision trees and/or random forest, or other statistical and/or machine learning algorithms for more efficient analysis and quicker convergence of optimized results. User data 402 may be filtered using feature engineering models to maximize rewards, representative of the outcome objectives, for providing the best data to the predictive algorithms that gives the most significant results of indicating user identity or authentication. When data sets are found to have little or no effect on the outcome, these data sets may be eliminated from the user set of user data 402 for analysis in the predictive models. As such, a preliminary filter may be provided to efficiently process user data 402 in the predictive phases.

In some embodiments, the data points of user data 402 input into the feature engineering model may be processed to determine features for input into the predictive models for generating the best solutions for authorization of users according to a set of rules. Generating these features may reduce the total variables processed the rules engines (e.g., network rules engine 208 and DDIL rules engine 210) saving time and processing power. When the training phase is complete, the final model comprising the final data subsets of user data 402 that may be put into use processing new data in network environment 202 and DDIL environment 204 and on the mobile devices as obtained by DDIL environment 204 from requesting user 302. In this way only variables that are useful to the given authentication purposes may be used. For example, requesting access to DDIL environment 204 may require a higher threshold than already being an authorized user and requesting a higher security level or access to a new application. As such, various subsets of user data 402 may be more relevant than other subsets based on the requests. Similar methods may be used to determine standardized weights for each of the attributes of requesting user 302 in user data 402. Pre-processing user data 402 to filter to the most significant attributes, and/or weight the various attributes, based on the requests may reduce authentication processing on the mobile devices.

After user data 402 has been filtered for more efficient and affective analysis, user data subsets may be fed into predictive models. Network models 212 may analyzed all data flowing through network environment 202 continuously in real time. The majority of data flow is typically marked with standard user tags and standard data tags such that the data flows smoothly without obstruction; however, in the event that new requests, new users, new documents, new applications, new uploads, new resources, and the like appear in the data flows, authentication and validation techniques may be triggered. As such, network models 212 may be trained on detection, authentication, and mitigation of these new entities. Network models 212 may determine a likelihood of a threat by obtaining user data 402, as described above, and comparing all attributes of user data 402 to known data to build a confidence, or likelihood of a threat, of user data 402. User data 402 including user ID data 404, behavioral data 406, and machine data 408, may be analyzed by looking for a history of associated data and similar events to determine if the requesting user 302 is a threat.

The determined likelihood may be compared to various threshold values at network rules engine 208 to determine if requesting user is a threat or how significance the threat is. Once determined that requesting user 302 is a threat, requesting user may be blocked from transferring any data, and threat mitigation techniques may be deployed. Threat and risk mitigation techniques are described in more detail below.

These techniques for authenticating users in network environment 202 may be stored as per-authentication for authenticated users, devices, and data, and permission may be provided such that the devices associated with the users may be connected to DDIL environment 204 and the data may be uploaded.

In some embodiments, pre-authentication of users/devices/data may be provided at network environment 202 and uploaded to DDIL environment 204. In some embodiments, pre-authentication may provide all necessary analysis of user data 402 to verify the user's identity with a likelihood above a threshold value. When requesting user 302 is authenticated, the user data 402 and user verification indication may be saved in DDIL environment 204. As such, requesting user 302 may be verified in DDIL environment 204 without accessing network environment 202. Therefore, any user that is verified externally may access DDIL environment 204 while DDIL environment 204 is disconnected from network environment 202. Furthermore, when DDIL environment 204 and network environment 202 are connected, new users that have been verified through the described authentication techniques herein may be added to DDIL environment 204 whitelist of verified users.

User data 402 may be analyzed by various methods including the above-descried rules engine to determine a likelihood of the identity of requesting user 302 being accurate and approved for permissions. User ID data 404 may be analyzed to determine if requesting user 302 is authorized to access network environment 202 and DDIL environment 204. User ID data 404 indicative of requesting user 302 may be compared to stored data in DDIL environment 204 when pre-authorization is not determined.

In some embodiments, behavioral data 406 may be analyzed to determine if requesting user 302 is authorized to access network environment 202 and DDIL environment 204. Behavioral data 406 may include any data that may be associated with actions of the user and tracked over time such as, for example, application usage, times of applications usage, common user computer interaction sequences, login times, logoff times, typing speed, common typing sequences and mistakes, common word and phrase usage, and the like. Behavioral data 406 may be compiled using various statistical and ML models to determine a likelihood of the user identity and if requesting user 302 should be authorized to access network environment 202 and/or DDIL environment 204.

Further still, machine data 408 may be analyzed. In some embodiments, machine data 408 may include device identification data (e.g., part serial numbers, digital identification numbers, and the like), IP address, stored application data, application and infrastructure provisioning data, and the like. Any data associated with requesting user device may be analyzed to determine that the requesting device is an approved device and/or has a historical association with requesting user.

As described above, user data 402 including user ID data 404, behavioral data 406, and machine data 408 may each be analyzed and scored to determine a likelihood of user identity and if authorization should be provided and, in some embodiments, user data 402 may be combined and/or analyzed together to determine the likelihood of user identity and a likelihood of requesting user 302 being a threat or risk. When requesting user 302 identity is verified (e.g., likelihood of user identity above a threshold value), requesting user 302 may be provided access to DDIL environment 204. In some embodiments, the above-described pre-authentication is a first step, and further authentication may be required within DDIL environment 204. In some embodiments, the analysis and results of the analysis are provided to DDIL environment 204 such that the user is already verified, and further ongoing analysis can be performed while requesting user 302 works in DDIL environment 204. This, however, is a simple case where requesting user 302 requests access while DDIL environment 204 is in communication with network environment 202, or DDIL environment 204 already has stored permissions for requesting user 302 and can be verified using typical methods. The scenarios described below, in some embodiments, may be performed in DDIL environment 204 when an anomaly is detected in DDIL environment 204 while DDIL environment 204 is disconnected from network environment 202.

In DDIL environment, user data 402 and/or subsets thereof may be fed into DDIL models 214 and/or DDIL rules engine 210. As described above DDIL rules engine 210 may comprise a set of functions associated with user data matrix or subset matrices as input that initiate actions based on the output of the function. For example, simple rules may dictate that if user data 402 does not relate to the compared stored data of pre-authorized users, then user data 402 is then sent to a peer-to-peer analysis phase. In instances described below, DDIL rules engine 210 may provide rules to determine if requesting user 302 is authorized, denied, or if more information is necessary to decide. The analysis described above may be performed by network models 212 and/or DDIL models 214 including neural networks, decision trees and/or random forest, or other statistical and/or machine learning algorithms including clustering, optimal and greedy matching, comprising classification and regression analysis, and the like for determining the best fit for the requests. As such, user data 402 may be weighted and/or filtered to optimal data sets for analysis by DDIL rules engine 210.

In some embodiments, if requesting user 302 is not pre-authorized, DDIL rules engine 210 may initiate peer-to-peer authentication 300 as shown in FIG. 3. Requesting user 302 may not provide enough information to be authenticated or information authenticating requesting user 302 may not be stored in DDIL environment 204. In some scenarios, requesting user 302 data may be analyzed in a peer-to-peer authentication. For example, requesting user 302 may request access to DDIL environment 204. In some embodiments, an initial firewall may filter initially risky requests; however, once the request passes this initial phase, the peer-to-peer analysis may begin. In the peer-to-peer analysis user data 402 of requesting user 302 may be sent to authorized users for approval and/or may be automatically compared to authorized user data histories.

As illustrated in FIG. 3, processor 304, which may execute the instructions of DDIL rules engine 210, may randomly select various users represented by selection blocks 306. In this scenario, users 1, 2, 4 are selected. Users 1, 2, 4 may be provided user data 402 or some subset thereof associated with requesting user 302. User data may comprise a subset of user data such as, for example, user ID data 404. User ID data 404 may include an image, name, and credential information. Peer-to-peer authorization workflow may request information about requesting user 302 from users 1, 2, 4. For example, the additional information may be confirmation that requesting user's identity is correct, that the user data is correct, and/or to confirm various subsets of user ID data 404. Receiving verification from the selected set of users 1, 2, 4, may increase the likelihood that requesting user's identity is correctly represented by user ID data 404 and therefore increasing the chance that requesting user is authorized to access the requested data. The confirmation of subsets of data from users 1, 2, 4 may be input into DDIL rules engine 210 and the output may initiate permissions for requesting user. In this case, the likelihood may be increased above a threshold value as compared by DDIL rules engine 210 and requesting user 302 may be authenticated and permissions may be processed for allowing requesting user to access DDIL environment 204 and any applications and tools associated therewith. In this example, the approvals provide a high enough score to overcome the approval threshold; however, the in some embodiments, the score may be below the approval threshold resulting in a state of "more information needed" or "denied."

As described above, approved users may sign off on requesting user based on history of interactions with the requesting user and build a risk score associated with the requesting user based on the sign off from the approved users; however, different attributes may have different significance. For example, requesting user 302 may provide identity information such as a name and picture. This identification information may easily be obtained from the internet and therefore, is not provided any weight. However, this identity information matched with a known IP address associated with the identity may be significant. Furthermore, the identity information may gain a higher score, or an increased likelihood of being accurate, when an approved user confirms that the name matches the image. As such, the authentication process is dynamic in real time in an iterative process based on the various inputs into DDIL rules engine 210.

In some embodiments, when peer information is requested in peer-to-peer authentication, users 1, 2, 4 may provide exemplary replies approve, deny, or neutral. As such, the approves, denies, and neutrals may be move to DDIL rules engine 210 for analysis providing potential rules engine output 410 (FIG. 4) of approve, deny, and more information needed. The resulting approval may result in a set of permission being provided to DDIL environment 204 and approved application access. Deny may result in denied access to DDIL environment 204. However, in some embodiments, compared thresholds may and DDIL rules engine analysis can result in approval to DDIL environment 204 a one level while denying application access or data access at a second level. Furthermore, more information may be needed to move on. In this case, user data 402 may be sent to additional approved users and/or user data may be compared to additional historic data sets comprising historical transaction and authentication data.

As described above, some attributes of requesting user 302 and rules may comprise various weights making some attributes and some rules relatively more and less significant. Similarly, known users may be weighted based on experience, rank, risk, and the like. As such, some approved user's replies in peer-to-peer authentication 300 may be more significant than others. For example, a user that has been recently approved and not been verified by network environment 202 may not be selected for feedback, or their feedback may not be considered by DDIL rules engine 210. Similarly, the feedback from a user with little experience and low rank may not be as significant as a user with many years of experience and high rank. Furthermore, some feedback from selected users 1, 2, 4, may be weighted more significantly than others based on the feedback. For example, users 1 and 2 provide approval responses and user 4 provides a deny response. The risk level of the deny response may be enough to override the approval responses.

In some embodiments, peer-to-peer authentication 300 may be tied to the attributes of the identities of users 1, 2, 4. For example, requesting access at level 1, users 1, 2, 4, are selected from a set of users at level 1. As such, requesting user 302 can only gain permissions to level 1 from level 1 users.

FIG. 4 depicts an exemplary threat analysis 400 of DDIL rules engine 210 along with blockchain 412 for storage configured for analysis in network environment 202. In some embodiments, adaptive authentication may be used to determine a likelihood that the identity of the requesting user is correctly represented by user data 402 and/or can be authorized in DDIL environment 204. Adaptive authentication may intelligently select authentication parameters within DDIL environment for input into DDIL rules engine 210 as described above. As described above, user ID data 404, behavioral data 406, machine data 408, and/or any combination thereof may be analyzed by DDIL models 214 described above. Using adaptive authentication, DDIL models 214 may select the parameters that provide the significant results to the outcome of DDIL rules engine 210. Furthermore, in some embodiments, DDIL models 214 may be trained and programmed to determine authentication attributes necessary for optimally authenticating requesting user 302.

In some embodiments, a risk level is determined using the likelihood and/or by comparing the likelihood, or a standardized result thereof, to a threshold value. In some embodiments, each set of user data 402 (i.e., user ID data 404, behavioral data 406, and machine data 408) may be evaluated separately or each set of user data 402 may be evaluated together. DDIL rules engine output 410 may be one of approve, deny, or more information needed, and further analysis may be provided.

Furthermore, it should be noted, that requesting user 302 being authorized to access DDIL environment 204 does not provide requesting user 302 access to all resources of DDIL environment 204. Requesting user 302 may be associated with certain credentials that allow only some data access. For example, user 1 and user 2 may have a higher rank than requesting user 302. As such user 1 and user 2 may view documents, access files, and write data only allowable to the higher rank within DDIL environment 204. As such, all entities with DDIL environment 204 may comprise an associated permission level that requesting user 302 may or may not have.

During the above-described authentication processes, all data indicative of any events may be stored in blockchain 412. All events may be stored in encrypted event logs with a digital identifier (e.g., Trusted Platform Module (TPM) keys). Public key can be used to verify and audit blockchain 412 when connected to network environment 202. The events herein may comprise user data 402 as well as data indicative of all logged actions taken by users, DDIL models 214, DDIL rules engine 210, and any other processing actions. Furthermore, blockchain 412 may comprise a plurality of blockchains each comprising separate and secure data storage for each entity in DDIL environment 204. Herein, each entity may be user, each computing device, each component of each computing device, or any combination thereof. As such, data may be stored separately in individual blocks, and/or individual blockchains to maintain security and independent data logging that may be compared when DDIL environment 204 is connected to network environment 202. As such, the data stored in blockchain 412 may be configured to be accessed by network environment 202 for verifying actions and authentication taken in DDIL environment 204 while disconnected from network environment 202.

In some embodiments, once DDIL environment 204 is connected with network environment 202, blockchain 412 comprising actions taken in DDIL environment 204 while disconnected may be uploaded to network environment 202 and analyzed, or network environment 202 may be connected such that network environment 202 may access the data stored on blockchain 412. When DDIL environment 204 is connected to network environment 202, DDIL environment 204 may be placed into a standby mode. The standby mode may block DDIL environment 204 from fully connecting to network environment 202 and making changes as the events during disconnect have not yet been verified. Therefore, DDIL environment 204 may not be fully connected with permissions to upload data and make changes in network environment 202 until all actions have been verified and requesting user 302 authentication is verified. This action blocks any unwanted software from being uploaded and infecting network environment 202.

As described above, when DDIL environment 204 is connected to network environment 202, network environment 202 may access the data stored on blockchain 412 and analyze and verify the data and events taken while offline. Network environment 202 may utilize network models 212 and/or network rules engine 208 to verify the authentication of requesting user 302. Network rules engine 208 may comprise the same or similar rules as DDIL rules engine 210 but may also be connected to a permissions server, which includes additional information. As such, network rules engine 208 may access historical data including permissions and rank data associated with requesting user 302. Therefore, requesting user 302 authentication can be verified by network environment 202.

Furthermore, an audit of the events taken in DDIL environment 204 while disconnected may be performed. Network environment 202 may analyze each block and each blockchain of blockchain 412 and recognize any inconsistencies in the data logs. For example, if an authentication token was provided to requesting user 302, but in the secondary analysis by network environment 202 it is found that a user did not sign off on the requesting user in a peer-to-peer fashion, it may be determined that there is a high-level threat as the secondary review analysis of the independently logged actions do not align. As described above, each event is tied to each platform, application, user, and device. As such, each chain of blockchain 412 comprises secure data logs for each event associated with each entity such that any inconsistencies can be detected.

When a threat or general inconsistencies are detected, DDIL environment 204 may be blocked from further communication until the inconsistencies are resolved, or the threat is eliminated. This prevents any threats from spreading to other devices and into other DDIL environments. Furthermore, if a threat is detected, an automatic alert may be sent to other networks to look for the threat. When other DDIL environments are connected, network environment 202 may specifically look for the threat and update all DDIL environments with software blocking the threat. Similarly, professionals may be alerted of detection of inconsistencies and threats, and the professionals may act to mitigate any threats. The professionals may review any conflicts between chains resolve the inconsistencies.

When network environment 202 has verified all users and events of DDIL environment 204, any updates to applications, infrastructure, and data storage may be uploaded. Network environment 202 may provide updates to DDIL environment 204 or, in some embodiments, DDIL environment 204 may connect directly to the Internet for updates from cloud computing services. Furthermore, any changes to personnel, credentials, ranks, permissions, and the like associated with users of DDIL environment 204 may be updated while connected.

Figure 5:
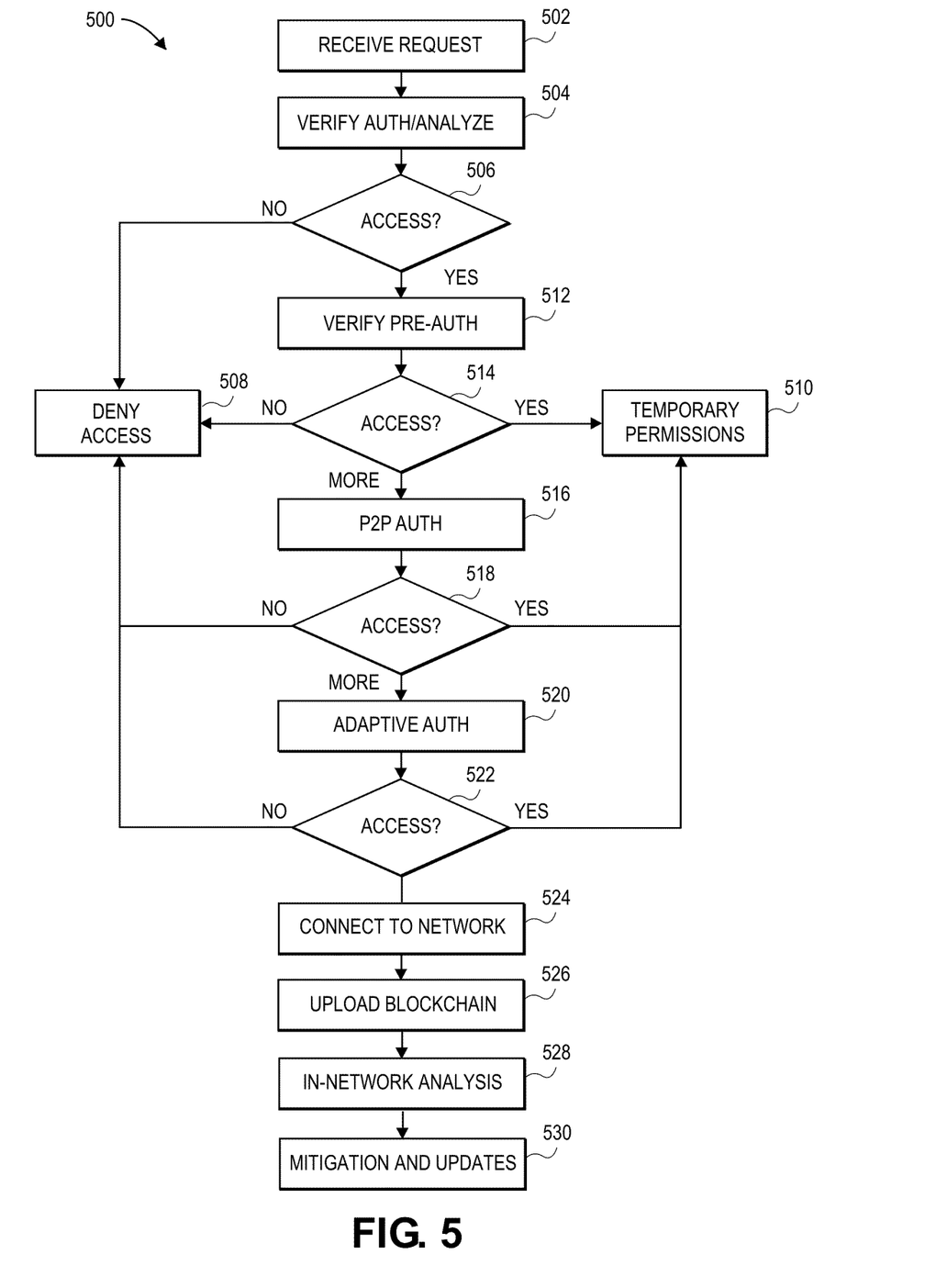
FIG. 5 depicts an exemplary flow chart illustrating a method of authenticating a request in network environment and DDIL environment.

FIG. 5 depicts a flow chart 500 illustrating a process of authenticating a user in network environment 202 and DDIL environment 204. At step 502, an anomaly is detected in network environment 202 and/or DDIL environment 204.

The anomaly may be, in some embodiments, requesting user 302 requesting access to network environment 202 and/or DDIL environment 204. Requesting user 302 may be a user and/or a device requesting access to applications, documents, data, and/or a higher level of data access/credential than currently permitted, and the like. Furthermore, in some embodiments, the anomaly may be a new communication connection request from a new device and/or detection of a new application or an attempt to upload data from new or pre-existing users.

At step 504, the request may be compared to data stored in network environment 202. If requesting user 302 is pre-authenticated and the pre-authentication indication, then permissions are stored in network environment 202. If requesting user 302 is not pre-authenticated, the above-described analysis is performed by network models 212 and network rules engine 208 to authenticate the user by analysis of user data 402. At decision step 506 indicating "yes," then the request is granted and requesting user 302 is provided permissions to access DDIL environment 204 at step 506 by network rules engine 208. If the analysis of user data 402 does not meet a threshold values as compared by network rules engine 208, requesting user is denied at step 508.

At steps 512-522 flow chart 500 illustrates processes that may implement various in-DDIL environment authentication techniques indicated. The "more" designation means that more information is required to make a decision. However, if data is stored indicating that requesting user is a known threat or simply does not have the correct credentials to access DDIL environment 204 or resources thereof, access may be denied at step 508 blocking requesting user 302 from DDIL environment 204. Furthermore, at step 508, when access is denied, risk mitigation techniques may be initiated including notifying approved users of DDIL environment 204 and automating periodic checks of data associated with requesting user 302.

At step 512, any further analysis of data input during the request of requesting user 302 may be performed. For example, requesting user may be preauthorized as described above and access may be granted at step 514. However, requesting user 302 may not be preauthorized, but an extensive check of user data 402 may verify the user identity by verifying a history of requesting user 302 with other users and/or the requesting user device and DDIL rules engine 210 may decide at step 514 to grant access and retrieve permissions at step 510. As such, in this exchange a decision by DDIL rules engine 210 may be made at step 514 to deny access at step 508, provide temporary permissions at step 510, or to retrieve more information at step 516.

At step 516, user data 402 associated with requesting user 302 may be provided to all users or an intentionally selected or a randomly selected subset of approved users in DDIL environment 204 as described in embodiments above. The subset of users may review user data 402 and provide feedback indicating example replies of deny, approve, or neutral. In some embodiments, users may provide more detailed feedback in the form of notes to go along with the replies.

At step 518, DDIL rules engine 210 receives the feedback from the subset of users and outputs initiation of approval and initiates permissions, denial and blocks requesting user 302, or needs more information to make a decision and moves to step 520.

At step 520, further analysis in the form of adaptive authentication may be performed. As described above, adaptive analysis may utilize DDIL models 214 to intelligently determine attributes of user data 402 that may be used to efficiently authenticate the user. DDIL models 214 may be trained on data that significantly impacts the outcome of authorizations based on requests and user data 402 may be reduced to those subsets. Further analysis may be performed by DDIL models 214 and DDIL rules engine 210 to determine if requesting user 302 should be authenticated at step 522.

At step 524, DDIL environment 204 may be reconnected to network environment 202. As described above, all data and events associated with DDIL environment and described in steps 506-522 may be stored in data logs on blockchain 412. At step 526, blockchain 412, chains, blocks, and/or the data stored thereon may be uploaded to network environment 202 and/or network environment 202 may be allowed access to blockchain 412.

At step 528, in-network environment analysis of the data stored on blockchain 412 is performed. As described above, the analysis includes verification of the requested user authentication and an audit of data logs on each chain, where each chain stores data indicative of all events associated with each corresponding user, device, application, resource, and the like. As such, all data corresponding to each entity in DDIL environment 204 is stored separately and securely such that the audit can be performed with integrity.

At step 530, the results of the verification of the requesting user authentication and the data log audit may lead to various processes including updating stored data, resources, and the like in both network environment and DDIL environment 204 when authentication and the data logs are verified. Furthermore, risk analysis and mitigation procedures described above may be performed when authentication of requesting user 302 is not verified and/or data log audit turns out to be inconsistent.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. One or more non-transitory computer-readable media that store computer-executable instructions that, when executed by at least one processor, perform a method of authenticating a request on a secure network, the method comprising:
   receiving the request to transfer data on the secure network from a requesting device by a requesting user,
   wherein the request comprises requesting to communicatively connect to a denied, disrupted, intermittent, and limited-bandwidth (DDIL) environment,
   generating an offline authorization token for the requesting user associated with the request to access the DDIL environment;

obtaining user ID data of the requesting user, behavioral data, and machine data from the requesting device;

comparing each of the user ID data, the behavioral data, and the machine data to corresponding historical data to determine a likelihood that the request is a threat;

comparing, by a rules engine, the likelihood that the request is the threat to a threshold value to determine a risk level associated with the request; and authenticating the request based on the risk level and the offline authorization token.

2. The media of claim 1, wherein the method further comprises comparing the user ID data, the behavioral data, and the machine data to the corresponding historical data by a machine learning algorithm to determine the likelihood of the threat of the request.

3. The media of claim 1,
wherein the DDIL environment comprises locally stored infrastructure from a cloud-based provider.

4. The media of claim 3, wherein the method further comprises:
storing the user ID data, the behavioral data, the machine data, the likelihood, and authentication data to a blockchain in the DDIL environment,
wherein, when connected to a network environment, the DDIL environment is configured to:
provide access to the blockchain to the network environment for verifying the authentication data;
update infrastructure and applications from the cloud-based provider; and
audit data logs stored on the blockchain.

5. The media of claim 3, wherein the method further comprises performing a peer-to-peer authentication of the request, the peer-to-peer authentication comprising:
randomly selecting a subset of approved users in the DDIL environment from a set of approved users authorized to access the DDIL environment;
providing at least a subset of the user ID data to the subset of approved users;
receiving feedback from the subset of approved users; and
modifying the likelihood of the request being the threat based on the feedback from the subset of approved users.

6. The media of claim 3, wherein the method further comprises a peer-to-peer authentication of the request, the peer-to-peer authentication comprising:
randomly selecting a subset of users from a set of users authorized to access the DDIL environment;
providing at least the user ID data to the subset of users;
receiving at least one denial of the request to communicatively connect to the DDIL environment;
denying the request to access the DDIL environment; and
storing denial data indicative of the user ID data, the at least one denial, and the at least one denial in a blockchain configured to be uploaded to a network environment when the DDIL environment is connected to the network environment.

7. The media of claim 3, wherein the DDIL environment comprises a local network of integrated mobile devices associated with military personnel.

8. The media of claim 3,
wherein the request comprises requesting access to the DDIL environment,
wherein the method further comprises denying access to resources in the DDIL environment to a user associated with the request.

9. A system for authenticating a request on a secure network, the system comprising:

at least one data store;
at least one processor; and
one or more non-transitory computer-readable media that store computer-executable instructions that, when executed by the at least one processor, perform a method of authenticating the request on the secure network, the method comprising:
receiving the request to transfer data on the secure network from a requesting device,
wherein the secure network is a denied, disrupted, intermittent, and limited-bandwidth (DDIL) environment,
wherein the DDIL environment comprises locally stored infrastructure from a cloud-based provider;
obtaining user ID data of a requesting user, behavioral data, and machine data from the requesting device;
comparing, within the DDIL environment, each of the user ID data, the behavioral data, and the machine data to corresponding historical data to determine a likelihood that the request is a threat;
comparing, by a rules engine within the DDIL environment, the likelihood that the request is the threat to a threshold value to determine a risk level associated with the request; and
authenticating the request based on the risk level.

10. The system of claim 9, wherein the method further comprises comparing the user ID data, the behavioral data, and the machine data to the corresponding historical data by a machine learning algorithm to determine the likelihood of the threat of the request.

11. The system of claim 10,
wherein the request comprises requesting to communicatively connect to the DDIL environment,
wherein the method further comprises generating an offline authorization token for the requesting user associated with the request to access the DDIL environment.

12. The system of claim 11, wherein the rules engine generates an approval designation from an options list of approve, deny, and more information needed.

13. The system of claim 12, wherein the method further comprises:
continually analyzing and storing request data associated with the requesting device and the requesting user associated with the requesting device; and
authenticating actions associated with the requesting user and the requesting device after the request is authorized.

14. A method of authenticating a request on a secure network, the method comprising:
receiving the request to transfer data on the secure network from a requesting device;
wherein the secure network is a denied, disrupted, intermittent, and limited-bandwidth (DDIL) environment comprising locally stored infrastructure from a cloud-based provider;
obtaining user ID data of a requesting user, behavioral data, and machine data from the requesting device;
comparing, within the DDIL environment, each of the user ID data, the behavioral data, and the machine data with corresponding historical data to determine a likelihood that the request is a threat;
comparing, by a rules engine within the DDIL environment, the likelihood that the request is the threat to a threshold value to determine a risk level associated with the request; and
authenticating the request based on the risk level.

15. The method of claim 14, further comprising:
storing the user ID data, the behavioral data, the machine data, the likelihood, and authentication data to a blockchain in the DDIL environment,
wherein, when connected to a network environment, the DDIL environment is configured to:
provide access to the blockchain to the network environment for verifying the authentication data; and
audit data logs stored on the blockchain.

16. The method of claim 14, further comprising:
randomly selecting a subset of approved users in the DDIL environment from a set of approved users authorized to access the DDIL environment;
providing at least a subset of the user ID data to the subset of approved users;
receiving feedback from the subset of approved users; and
modifying the likelihood of the request being the threat based on the feedback from the subset of approved users.

17. The method of claim 14, further comprising:
randomly selecting a subset of users from a set of users authorized to access the DDIL environment;
providing at least the user ID data to the subset of users;
receiving at least one denial of the request to communicatively connect to the DDIL environment;
denying the request to access the DDIL environment; and
storing denial data indicative of the user ID data and the at least one denial in a blockchain configured to be uploaded to a network environment when the DDIL environment is connected to the network environment.

18. The method of claim 14, wherein the DDIL environment comprises a local network of integrated mobile devices associated with military personnel.

19. The method of claim 14,
wherein the request comprises requesting access to the DDIL environment,
wherein the method further comprises denying access to resources in the DDIL environment to the requesting user associated with the request.

20. The method of claim 14, wherein the method further comprises:
generating an offline authorization token for the requesting user associated with the request to access the DDIL environment; and
authenticating the request further based on the offline authorization token.

* * * * *